United States Patent [19]

Ford

[11] 4,368,109
[45] Jan. 11, 1983

[54] ELECTROLYTIC CELL WITH INTER-ELECTRODE SPACER MEANS

[75] Inventor: James M. Ford, Cleveland, Tenn.

[73] Assignee: Olin Corporation, New Haven, Conn.

[21] Appl. No.: 222,096

[22] Filed: Jan. 2, 1981

Related U.S. Application Data

[63] Continuation-in-part of Ser. No. 204,127, Nov. 5, 1980.

[51] Int. Cl.³ .................... C25B 9/00; C25B 11/00; C25B 13/08
[52] U.S. Cl. .................... 204/253; 204/279; 204/286; 204/296
[58] Field of Search .................... 204/252–258, 204/263–266, 279, 286

[56] References Cited

U.S. PATENT DOCUMENTS

| | | | |
|---|---|---|---|
| 3,378,480 | 4/1968 | Reinshagen et al. | 204/253 |
| 3,960,697 | 6/1976 | Kircher et al. | 204/252 |
| 3,975,255 | 8/1976 | Kircher | 204/252 |
| 4,014,775 | 3/1977 | Kircher et al. | 204/252 |
| 4,026,782 | 5/1977 | Bouy et al. | 204/254 |
| 4,138,373 | 2/1979 | Ukihashi et al. | 521/38 |
| 4,175,025 | 11/1979 | Creamer et al. | 204/253 |
| 4,207,165 | 6/1980 | Mose et al. | 204/258 |
| 4,253,932 | 3/1981 | Mose et al. | 204/279 X |

FOREIGN PATENT DOCUMENTS 2909640 9/1980 Fed. Rep. of Germany .
51-126398 11/1976 Japan .

*Primary Examiner*—Donald R. Valentine
*Attorney, Agent, or Firm*—Ralph D'Alessandro; Donald F. Clements; Thomas P. O'Day

[57] ABSTRACT

In an electrolytic cell, spacers of predetermined thickness are positioned with improved sealing apparatus between the plurality of adjacently positioned and generally parallel electrodes to define and maintain a uniform gap of predetermined thickness between planes which pass through at least the adjacent sides of each pair of adjacent electrode frames.

22 Claims, 7 Drawing Figures

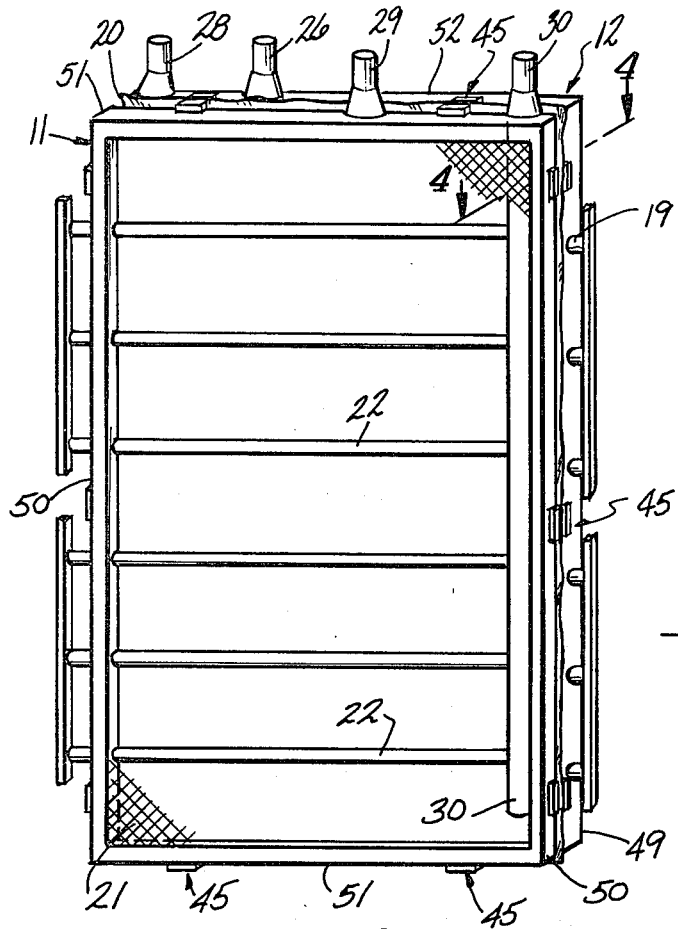
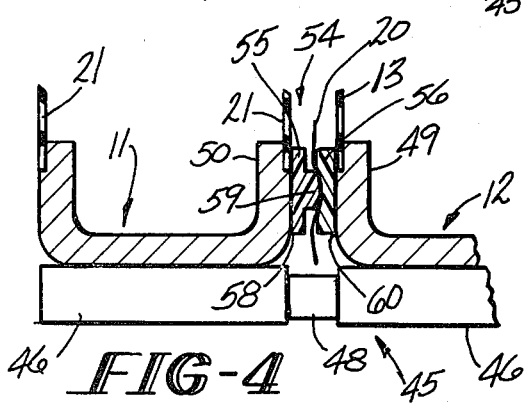
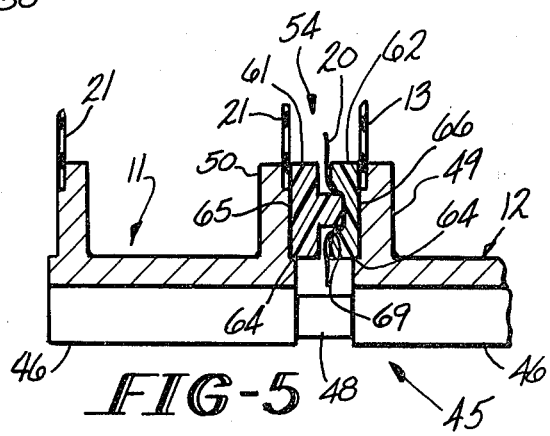
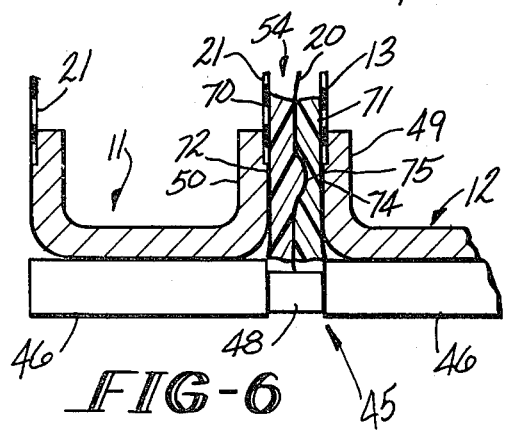
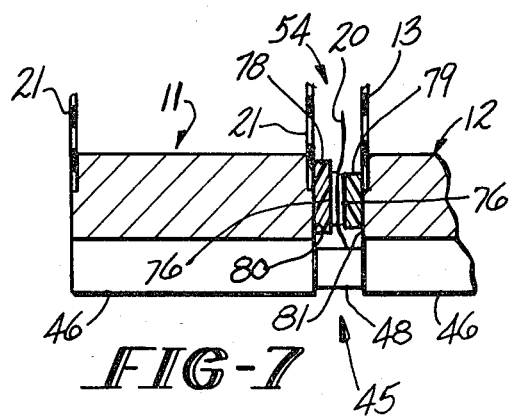

ELECTROLYTIC CELL WITH INTER-ELECTRODE SPACER MEANS

BACKGROUND OF THE INVENTION

This application is a continuation-in-part of application Ser. No. 204,127, filed Nov. 5, 1980.

The present invention relates to spacer means suitable for use in a filter press-type electrolytic cell. More particularly, the invention relates to spacer means utilized to maintain a fixed and predetermined gap between the adjacent electrode frames in an electrolytic cell.

Commercial cells for the production of chlorine and alkali metal hydroxides have been continually developed and improved over a period of time dating back to at least 1892. In general, chlor-alkali cells are of the deposited asbestos diaphragm type or the flowing mercury cathode type. During the past few years, developments have been made in cells employing separators having ion exchange properties which promise advantages over either diaphragm or mercury cells. It is desirable to take advantage of existing technology, particularly in diaphragm cells, but it is also necessary to provide cell designs which meet the requirements of these newer separator materials. Since suitable separator materials, such as those marketed by E. I. Du Pont de Nemours and Company under the trademark "Nafion ®" and by Asahi Glass Company Ltd. under the trademark "Flemion ®", are available primarily in sheet form, the most generally used cell employing such separators are of the "filter press" type. Filter press cells may employ electrode structures which are monopolar or bipolar.

In the filter press cell, separators in sheet form are clamped between the sides of frame members. The sealing means employed, normally elastomeric gaskets, must effectively provide a fluid-tight seal between the frame members and the separator without damaging the separator. Part of the difficulty in obtaining a fluid-tight seal has been found to reside in the fact that the gaskets utilized to separate the electrode frame members are available with thicknesses that widely vary because of large manufacturing tolerances.

It has been found in the assembly of filter press membrane cells that this difference in thickness between the gaskets employed on adjacent electrode frames can present problems when attempting to compress the frames into a fluid-tight cell. Frequently, hydraulic rams or other types of pressure-applying apparatus are employed to compress the electrode frames and the separating gaskets together. Where there are differences in the thickness of the gaskets, it has been found that each gasket is not subjected to an equal level of compression. The thicker gaskets are naturally subjected to greater compression than thinner gaskets. Where the difference in thickness is too great, a predetermined compression force applied to a cell and its component electrode frames can leave spaces between the thinner gaskets and adjacent frames so that fluid leakage will occur. To correct this, additional pressure must be applied to the electrode frames to achieve a level of compression in the separating gaskets that will form a fluid-tight seal. Frequently, during this additional compression-applying step, excessive force can be applied which causes the frames to deform or bend. Additionally, if the surfaces of the electrode frames are not completely flat or are rounded, it has been found that the gaskets will pop out from between the electrode frames because of the contour of the frames and the pressure being applied to the gaskets. This situation has necessitated that frames be individually assembled and carefully aligned to prevent leakage. To correct, for example, a 0.010 of an inch spacing gap between a gasket and an adjacent frame that is causing fluid leakage, it has been found necessary to tighten all of the gaskets 0.010 of an inch to stop the leak.

Sealing means, including gaskets and other appropriate apparatus, for cells employing ion exchange membranes as separators included those described in U.S. Pat. No. 4,026,782, issued May 31, 1977, to P. Bouy et al., U.S. Pat. No. 4,175,025, issued Nov. 20, 1979, to E. D. Creamer et al., and U.S. Pat. No. 4,207,165, issued June 10, 1980, to Mose et al. U.S. Pat. No. 4,026,782 teaches bipolar cells having frames with recesses into which the sealing members fit. In one of the recesses, a diaphragm is sealed into the frame with a putty or caulked gasket. This sealing arrangement requires a complex frame structure which utilizes spacer apparatus that is a part of one of the electrode frames. This arrangement suffers from the disadvantage of not being able to vary the gap between the electrode frames with simply the replacement of the sealing means should it be necessary to have a different gap between the electrode frames.

U.S. Pat. No. 4,175,025 describes filter press frames having at least one formed recess into which a gasket is fit. The membrane is sized to extend beyond the edges of the frame so that shrinkage of the membrane during regeneration will not prevent its re-use. Adjacent frames may contain recesses which are opposite each other, but of different sizes. Gaskets having different hardnesses are used to seal the membrane between them. The gap between the electrode frames in this type of sealing arrangement is entirely dependent upon the gasket height and the amount of compression applied to the frames. Thus, the gap can vary between each pair of adjacent frames as the thickness of the gaskets employed varies or the recesses machined into the frames vary.

To provide recesses in the frame members of the type disclosed in U.S. Pat. Nos. 4,026,782 and 4,175,025, operations such as machining must be employed. These operations add undesired increases to the cost of producing the frames.

The arrangement disclosed in U.S. Pat. No. 4,207,165 employs a fixed spacer member between the adjacent electrodes to establish a desired gap. However, the method of securing the membrane between the gasket members requires massive, expensive electrode frames and could promote tearing of the membrane or separator. Additionally, this technique could permit the membrane to slip completely from between the retaining electrodes.

The aforementioned problems are solved in the design of the apparatus comprising the present invention by providing in a filter press membrane electrolytic cell improved spacer means of a predetermined thickness positioned between the adjacent electrode frames to define and maintain a uniform gap between the frames when the frames are pressed together in fluid-tight fashion by clamping means and which are employed in combination with improved sealing means to prevent the undesired slipping of the separator means during assembly.

SUMMARY OF THE INVENTION

It is an object of the present invention to provide sealing means in filter press cells using frames which are simple and in which direct contact between the separator and the frame member is avoided.

Another object of the present invention is to provide sealing means which prevent undesired slippage between the sealing means and the slippery surfaces of the separator which is wet with electrolytes such as caustic solutions.

A further object of the present invention is to provide sealing means which contribute to the control of the compression pressures employed.

It is a further object of the present invention to provide spacer means that can be placed between adjacent electrode frames having sealing means separating the frames and a separator positioned between each frame to provide a positive fixed gap which is established independently of sealing means pressures or sealing means compression and independently of any bolt torquing or hydraulic or other similar closure system forces utilized to compress the frames together during assembly of the cell.

It is yet another object of the present invention to provide non-compressible and insulating spacer means between adjacent electrodes which ensure a uniform gap between the electrodes and which facilitate the forming of a fluid-tight seal among the sealing means and electrode frames during assembly and operation of the electrolytic cell.

It is a feature of the present invention that improved sealing means are installed with spacer means to provide a more positive and secure gripping of the separator between each pair of electrode frames as well as maintaining a fixed and generally uniform gap between the electrode frames.

It is another feature of the present invention that spacer means can be installed directly between outrigger blocks attached to each electrode frame.

It is a further feature of the present invention that the spacer means are substantially non-compressible and insulating.

It is yet another feature of the present invention that the spacer means do not take the full closure force applied to the cell during assembly, but bear only those excess forces that result from varying deformation of the sealing means and cell dimension variations.

It is an advantage of the present invention that the improved sealing means and spacer means of the present invention avoid unequal distribution of the compression among the sealing means when the electrolytic cell is assembled.

It is a further advantage of the present invention that the improved sealing means and spacer means provide an easy method of correcting any fluid leakage from between the electrode frames during operation.

It is yet another advantage of the present invention that the improved sealing means and spacer means maintain a uniform gap between all of the electrode frames independently of the sealing means pressures, sealing means compression or closure system force which is applied to compress the cell.

These and other objects, features and advantages are provided in an electrolytic cell having a plurality of adjacently positioned electrodes held together by clamping means by providing spacer means of predetermined thickness removably connected to at least a first frame and a second frame, each frame having opposing sides with electrode faces connected thereto, separator means positioned between sealing means so that at least one of the opposing sides of the first frame and the adjacent opposing side of the second frame define a first plane and a generally parallel second plane such that the spacer means define and maintain a uniform gap between the planes when the frames are pressed together in fluid-tight fashion.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 3 illustrates a front elevation in perspective view of a pair of adjacent electrode frames employing the novel sealing means and spacer means of the present invention;

FIG. 4 is an enlarged partial sectional view of th electrode frame of FIG. 3 taken along the line 4—4 showing one embodiment of the sealing means in cooperative association with the spacer means of the present invention;

FIG. 5 depicts a partial sectional view of another embodiment of the sealing means in cooperative association with the spacer means of the present invention;

FIG. 6 illustrates a partial sectional view of an additional embodiment of the sealing means in cooperative association with the spacer means of the present invention; and FIG. 7 shows a partial sectional view of a further embodiment of the sealing means in cooperative association with the spacer means of the present invention used with bar-shaped frames.

DETAILED DESCRIPTION OF THE PREFERRED EMBODIMENT

Figures 1, 2:
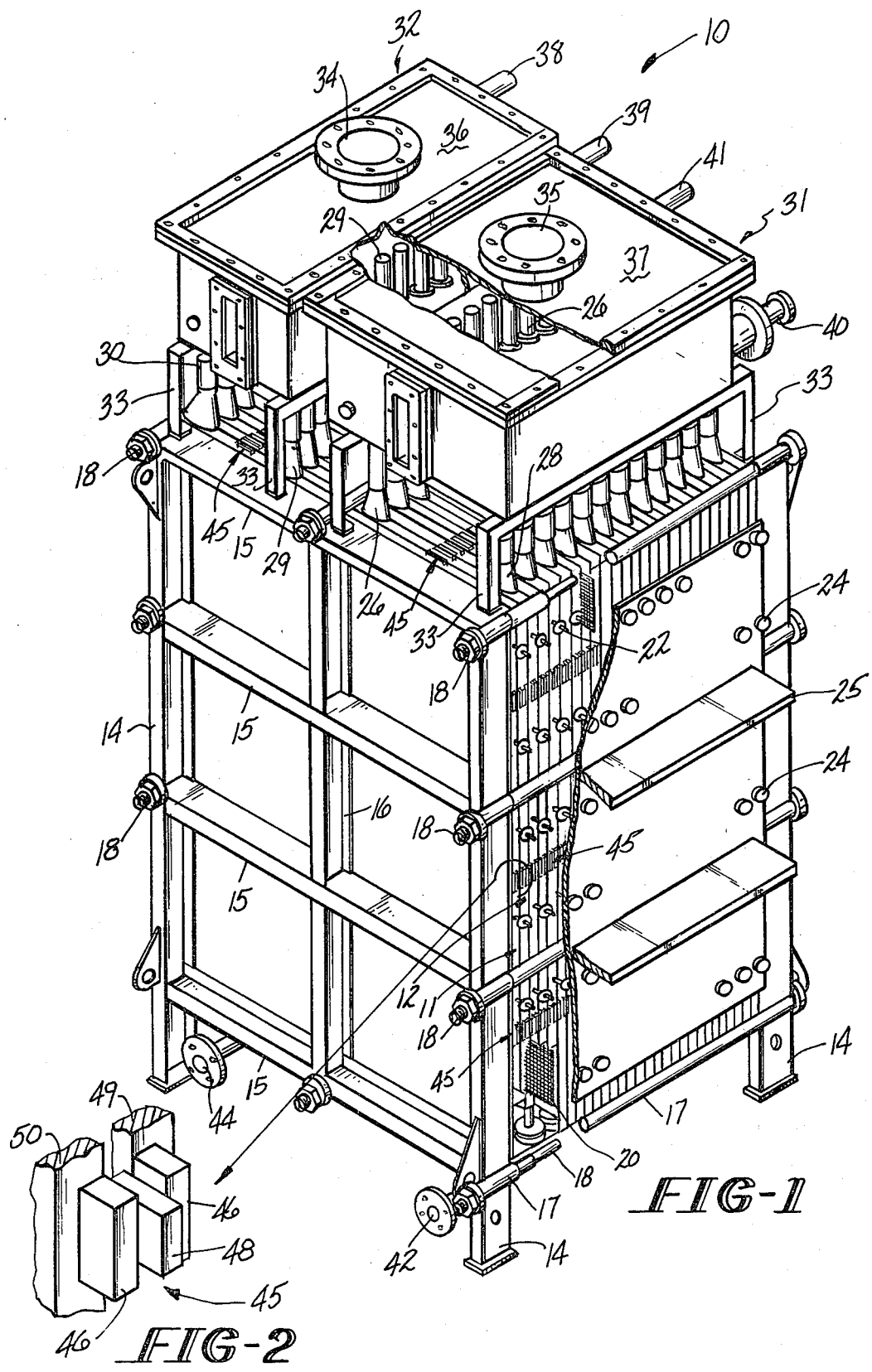
FIG. 1 is a side perspective view of a monopolar filter press membrane electrolytic cell with appropriate portions broken away to illustrate the anodes, cathodes, anolyte disengager, the catholyte disengager, and the positioning of the spacer means between each pair of electrode frames.
FIG. 2 is an enlarged diagramatic illustration of the spacer means positioned in a partially inserted manner between two adjacent electrode frames, but not showing the sealing means.

Referring to FIG. 1, a filter press membrane cell, indicated generally by the numeral 10, is shown in a side perspective view. It can be seen that cathode frames 11 and anode frames 12 alternate and are oriented generally vertically. The cathode frames 11 and anode frames 12 are supported by vertical side frame members 14, horizontal side frame members 15, and intermediate vertical side frame members 16 (only one of which is shown). The cathode frames 11 and anode frames 12 are pressed together and secured by a series of tie bolts 18 which are inserted through appropriate mounting means affixed to the vertical side frame members 14 and horizontal side frame members 15. To prevent short circuiting between the electrodes during the electrolytic process, the tie bolts 18 have tie bolt insulators 17 through which the tie bolts 18 are passed in the area of the cathode frames 11 and anode frames 12.

Electrical current is passed, for example, from an external power source through the anode bus and then via anode bus nuts, both not shown, into the anode conductor rods 19 of FIG. 3. From that point, the anode conductor rods 19 carry the current into the opposing anode faces 13, see briefly FIGS. 4–7. The current continues flowing through the membrane 20, through the opposing cathode faces 21, see briefly FIGS. 4–7, the cathode conductor rods 22 and the cathode bus nuts 24 to the cathode bus 25 where it continues its path out of the cell. The cathode bus nuts 24 are only partially shown in FIG. 1 since there is a corresponding cathode bus nut for each cathode frame 11 and cathode conductor rod 22. Ion-selective permeable membranes 20 are diagramatically shown in FIG. 1 to illustrate how each anode frame 12 and cathode frame 11 are separated by the membrane.

Projecting from the top of anode frames 12 and cathode frames 11 are a series of fluid flow conduits. FIGS. 1 and 3 show anode risers 26 and anode downcomers or anolyte return lines 28 projecting from the top of each anode frame 12. Similarly, cathode risers 29 and cathode downcomers or catholyte return lines 30 are shown projecting from the top of each cathode frame 11. The risers are generally utilized to carry the appropriate electrolyte fluid with the accompanying gas, either anolyte with chlorine gas or catholyte with hydrogen gas, to the appropriate disengager mounted atop the filter press membrane cell 10. The anolyte disengager is indicated generally by the numeral 31, while the catholyte disengager is indicated generally by the numeral 32. Each disengager is supported atop of the cell 10 by disengager supports 33, seen in FIG. 1. It is in each of these disengagers that the entrained gas is enabled to separate from the liquid of the anolyte or catholyte fluid, as appropriate, and is released from the appropriate disengager via either a cathode gas release pipe 34 or an anode gas release pipe 35 affixed to the appropriate catholyte disengager cover 36 or anolyte disengager cover 37.

Also partially illustrated in FIG. 1 is the catholyte replenisher conduit 38 which carries deionized water into the catholyte disengager 32. The deionized water is appropriately fed through the catholyte disengager 32 to each cathode frame 11 in cell 10. A catholyte outlet pipe 39 is also partially illustrated and serves to control the level of liquid fluid in the catholyte disengager 32 by removing caustic to its appropriate processing apparatus.

An anolyte replenisher conduit 40 carries fresh brine into the anolyte disengager 31 and is best seen in FIG. 1. The fresh brine is then appropriately fed into each anode frame 12 with the existing anolyte fluid which is recirculated from the anolyte disengager 31 into each anode frame 12 via the downcomers 28. An anolyte outlet pipe 41 is also shown and serves to control the level of liquid in the anolyte fluid within the anolyte disengager 31 by removing the spent brine from the disengager 31 for regeneration.

Also shown in FIG. 1 are a cathodic bottom manifold 42 and an anodic bottom manifold 44, which are utilized to drain the appropriate electrodes.

The filter press membrane cell 10 has been described only generally since the structure and the function of its central components are well known to one of skill in the art. A more detailed and thorough description of the filter press membrane cell 10 is found in U.S. patent application Ser. No. 128,684, filed Mar. 10, 1980, now abandoned and assigned to the assignee of the present invention. This application is hereinafter specifically incorporated by reference in pertinent part insofar as it is consistent with the instant disclosure.

Still referring to FIG. 1, spacer means, indicated generally by the numeral 45, are shown appropriately fastened to the exterior of the cathode frames 11 and anode frames 12. The spacer means 45 are positioned about the cell 10 so that there are generally three along the longitudinal or bottom to top side members of each cathode frame 11 and anode frame 12, while two are generally spaced along the top and bottom portions of the electrodes. The enlarged diagramatic illustration in FIG. 2 shows the spacer means 45 comprising outrigger blocks 46 which are appropriately fixedly fastened to the side members of the adjacent cathode frames 11 and anode frames 12. Outrigger blocks 46 are normally welded to the electrode frames. A spacer block 48, as shown in FIG. 2, is partially removed and is positioned between the outrigger blocks 46. Because FIG. 2 is a diagramatic illustration, it does not show the membrane or separator 20, nor the sealing means or gaskets, which are positioned between the adjacent cathode frames 11 and anode frames 12 and are best seen in FIGS. 3 through 7. FIGS. 4–7 show how the spacer blocks 48 are positioned and retained by the outrigger blocks 46 along planes that pass through the adjacent opposing sides of the adjacent electrode frames.

FIG. 3 shows that the cathode frames 11 and anode frames 12 comprise anode vertical members 49, only one of which is shown, and cathode vertical members 50. Interconnecting the cathode vertical frame members 50 are the generally horizontal cathode frame members 51. Similarly, interconnecting the anode vertical frame members 49 are anode generally horizontal frame members 52, only one of which is shown. When assembled the appropriate cathode and anode frame members comprise cathode and anode frames 11 and 12 respectively, which have generally planar opposing first and second sides.

FIG. 4 shows the cooperation between the cathode frames 11, anode frames 12, spacer means 45, the sealing means or gaskets, indicated generally by the numeral 54, and the opposing surfaces of the separator or membrane 20. As seen in FIG. 4, separator or membrane 20 is positioned between gaskets 55 and 56, which are placed between the adjacent legs of the cathode vertical frame member 50 and the anode vertical frame member 49. Although not shown in their entireties in FIG. 4, the first and second generally planar cathode electrode faces 21 are shown fastened to one of the two cathode vertical frame members 50. The cathode vertical frame members combine with the horizontal frame members 52 to form the generally planar opposing first and second sides. The anode frame 12 also has generally planar electrode faces 13 fastened thereto. As seen in FIG. 4, a third generally planar electrode face 13 is fastened to the anode vertical frame member 49 on the first generally planar side of the anode frame 12 formed by the anode vertical frame members 49 and the anode generally horizontal frame members 52. Gasket 55 is comprised of a base portion which contacts the second side 58 of the cathode frame 11 at frame member 50 and a raised portion 59 which contacts the first surface of the separator or membrane 20. Gasket 56 contacts the first side 60 of the adjacent anode frame 12 at the vertical frame member 49 and the opposing second surface of separator or membrane 20. The area of contact for gasket 56 with the membrane 20 is greater than that of the raised portion 59 of gasket 55.

Welded to the cathode vertical frame member 50 and the partially illustrated anode vertical frame member 49 are outrigger blocks 46. Outrigger blocks 46 are shown generally as being rectangular with the same thickness as the frame of the appropriate electrode. Positioned between the outrigger blocks 46 is a removable spacer block 48. Spacer block 48 is selected with a predetermined thickness to ensure a uniform gap between the adjacent electrode frames. Spacer block 48 must be of a good insulating quality and essentially non-compressible. Spacer block 48 may be of any substance possessing these characteristics; however, micarta has been the preferred substance. Impregnated wood or un-impregnated suitable hardwood can also be employed as spacers. It is even possible that plexi-glass of sufficient strength could be employed.

In the embodiment shown in FIG. 5, the sealing means employed utilizes one end of gaskets 61 and 62 to rest against shoulders 64 of edges 65 and 66 of cathode vertical frame member 50 and anode vertical frame member 49, respectively. Separator or membrane 20 is sealed during compression between the raised portion 68 of gasket 61 and the inset portion 69 of gasket 62. Fixedly fastened to cathode vertical frame member 50 and the adjacent anode vertical frame member 49 are outrigger blocks 46. Positioned between outrigger blocks 46 is the spacer block 48, again selected to a suitable predetermined thickness to maintain a uniform gap between the adjacent electrode frames after the cell 10 is compressed.

FIG. 6 illustrates an additional embodiment of the sealing means 54 of the present invention in which the separator or membrane 20 is sealed between the gaskets 70 and 71. The gaskets 70 and 71 extend beyond the edges 72 and 74 of the cathode vertical frame member 50 and the anode vertical frame member 49, respectively. Under compression, the membrane or separator 20 is effectively sealed between the raised portion 75 of gasket 70 and gasket 71. Again, outrigger blocks 46 are fixedly fastened to the cathode vertical frame member 50 and anode vertical frame member 49. Placed therebetween is spacer block 48, selected according to a suitable predetermined thickness to establish the desired gap between the adjacent electrode frames.

FIG. 7 illustrates a further alternate embodiment of the sealing means 54 in cooperative association with the spacer means 45 of the present invention. In this embodiment, separator or membrane 20 is sealed between inserts 76 which prevent undesired friction between the membrane 20 and narrow gasket 79 and wider gasket 78. Gaskets 78 and 79 are positioned between the adjacent sides 80 and 81 of cathode frame 11 and anode frame 12, respectively. Fixedly fastened to the sides 80 and 81 are outrigger blocks 46. Spacer block 48 is positioned between the outrigger blocks 46 to establish the desired gap between the aforementioned planes which pass through the adjacent opposing sides of the adjacent electrode frames after the cell 10 is compressed.

Suitable as sealing means 54 are gaskets comprised of elastomer such as Neoprene, Hypalon, ethylenepropylene dimonomer (EPDM) or gum rubber. The hardness of the sealing means is not critical and any suitable hardness may be selected independently for either gasket. Preferably gaskets have a low degree of hardness which allows the gaskets to fill in irregularities on the frame members and thus permit reduced tolerances which minimizes, for example, machining of metal frames and reduces production costs.

During assembly tie bolts 18 are individually tightened around the perimeter of the cell 10. This tightening of the tie bolts 18 holds the individual electrode frames together. Between any two adjacent electrodes, the cathode frame 11 and the anode frame 12 are pressed together so that the sealing means 54 is compressed. Since each cathode frame 11 and anode frame 12 have individual gaskets which extend about the entire periphery of the electrode frames, the electrodes are separated by the individual gaskets and the membrane or separator 20 which is inserted therebetween. The opposing faces of the electrodes are separated by a uniform gap that is established by the thickness of the spacer block 48. Since the electrodes are compressed together by the application of a suitable closure force, the gaskets deform in a manner which effects a fluid-tight seal between the adjacent electrode frames, as well as securing the membrane 20 along both surfaces to avoid any undesired slippage. The amount of compression between the adjacent cathode frames 11 and anode frames 12 is determined by the thickness of the spacer block 48 which is pressed between the adjacent outrigger blocks 46 fixedly fastened to each electrode frame. Once the desired compression has been achieved, the tie bolts 18 are secured in a manner to retain this compression and the fluid-tight seal effected by the improved sealing means 54. A uniform inter-electrode gap is obtained because the spacer blocks 48 are distributed about the periphery of the electrode frames. Once a fluid-tight seal has been effected between any two adjacent cathode frames 11 and anode frames 12 so that the spacer blocks 48 are subject to compressive forces conducted through the adjacent outrigger blocks 46, any additional compressive force will be borne by the spacer blocks positioned between the adjacent cathode frame 11 and anode frame 12.

The width of the raised portion of the second gasket is selected to provide less area of contact with the separator than that of the first gasket. Further, the width of the raised portion is selected to provide the desired control of the gasket compression pressures and the gasket frame surface structural forces. Control of these pressures minimize compression set for gasket materials and bending or twisting of frame members. The embodiment of the novel sealing means shown in FIG. 5 is particularly suitable where the electrolytic cell employs higher compression pressures.

The width of the raised portion of the gasket is especially selected to provide the desired control of the gasket compression and of the frame surface structural forces. The width of the raised portion is kept narrow enough not to exceed the structural strength of the frame member. The force on the frame member per lineal inch of frame member is $F_i = P \times W$ where P is the gasket pressure of the raised portion and W is the expanded width of the raised portion in compression.

The expanded width $W = w \div (1-c)$ where w is the initial width of the raised portion and c is the fractional compression expressed as a decimal. The compression factor c is selected high enough to assure sealing, depending upon the gasket material and may be from 0.05 to 0.55 and preferably from 0.2 to 0.4.

A preferred embodiment of the sealing means of the present invention is that of the type illustrated in FIG. 6. The gaskets extend beyond the width of the frame so that the uncompressed gasket material outside of the frame will not slip into the higher pressure zone within the frame. The narrow raised portion of the one gasket mates with a narrow area on the second gasket to effectively seal the separator and take up the greatest amount of compression at the design force load.

Hydraulically permeable or impermeable separators may be employed in the electrolytic cell of the present invention. Preferably, inert flexible separators having ion exchange properties and which are impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. The equivalent weight of the perfluorosulfonic acid resin is from about 900 to about 1600 and preferably from about 1100 to about 1500. The perfluorosulfonic acid resin may be supported by a polyfluoroolefin fabric. A composite membrane sold commercially by E. I. Du Pont de Nemours and Company under the trademark "Nafion ®" is a suitable example of this membrane.

A second example of a suitable membrane is a cation exchange membrane using a carboxylic acid group as the ion exchange group. These membranes have, for example, an ion exchange capacity of 0.5–4.0 mEq/g of dry resin. Such a membrane can be produced by copolymerizing a fluorinated olefin with a fluorovinyl carboxylic acid compound as described, for example, in U.S. Pat. No. 4,138,373, issued Feb. 6, 1979, to H. Ukihashi et al. A second method of producing the above-described cation exchange membrane having a carboxyl group as its ion exchange group is that described in Japanese Patent Publication No. 1976-126398 by Asahi Glass Kabushiki Gaisha issued Nov. 4, 1976. This method includes direct copolymerization of fluorinated olefin monomers and monomers containing a carboxyl group or other polymerizable group which can be converted to carboxyl groups. Carboxylic acid type cation exchange membranes are available commercially from the Asahi Glass Company under the trademark "Flemion ®".

Frame members may be in the shape of rectangular bars, C or U channels, cylindrical tubes, elliptical tubes as well as being I-shaped or H-shaped. Preferably, the frame members are in the shape of a C channel as shown in FIGS. 4 and 6.

The materials of construction for frame members may be any which are resistant to corrosion by the electrolytes and the products of electrolysis. For example, metals such as iron, steel, stainless steel, nickel, titanium, or alloys of these metals may be used. Similarly, plastic materials such as polypropylene, polybutylene, polytetrafluoroethylene, FEP, and chlorendic acid based polyesters can be employed. However, the electrode frame members must be of a suitable material to permit the outrigger blocks 46 to be fixedly fastened hereto. For example, if the anode vertical and generally horizontal frame members 49 and 52 are made of titanium, outrigger blocks 46 made of titanium are then also used. If the cathode vertical and generally horizontal frame members 50 and 51 are made of nickel, the outrigger blocks 46 may be made of nickel or steel. It should also be noted that it is generally desired to have the outrigger blocks attached to the appropriate electrode near the tie bolts 18.

Electrolytic cells of the present invention provide the advantages of simultaneously:
(a) controlling gasket compression pressures;
(b) controlling gasket frame surface structural forces;
(c) efficiently forming a seal; and
(d) preventing gasket slippage.

In addition, cell assembly tolerances are improved and construction costs reduced. Lower compression pressures can be employed permitting the use of smaller compression means to further reduce cell costs.

While the preferred structure in which the principles of the present invention have been incorporated as shown and described above, it is to be understood that the invention is not to be limited to the particular details thus presented, but in fact, widely different means may be employed in the practice of the broader aspects of this invention. The scope of the appended claims is intended to encompass all obvious changes in the details, materials, and arrangements of parts which will occur in one of skill in the art upon a reading of the disclosure.

Having thus described the invention, what is claimed is:

1. In an electrolytic cell having a plurality of adjacently positioned electrodes in which electrolyte fluid is contained comprising at least:
(a) a first frame having a first generally planar side and an opposing second generally planar side to which are respectively connected a first generally planar electrode face and a second generally planar electrode face, at least the opposing second side defining a first plane, the first side and opposing second side further being connected by a first end portion defining the exterior of the first frame;
(b) a second frame having a first generally planar side and an opposing second generally planar side to which are respectively connected a third generally planar electrode face and a fourth generally planar electrode face, at least the first side defining a second plane adjacent the first plane and being generally parallel thereto, the first side and opposing second side further being connected to a second end portion defining the exterior of the second frame;
(c) separator means for separating the first frame from the second frame having a first surface adjacent the second electrode face and an opposing second surface adjacent the third electrode face;
(d) first sealing means contacting the second side of the first frame and the first surface of the separator means, the first sealing means having a contactable surface of a first predetermined surface area in contact with the separator means;
(e) second sealing means contacting the first side of the second frame and the second surface of the separator means having a first contactable surface with a first predetermined surface area adjacent the first side of the second frame and a second contactable surface with a second predetermined surface area contacting the separator means, the second predetermined surface area being less than the first predetermined surface area of the first sealing means;

(f) at least a first outrigger block fastened to the exterior of the first frame and at least a second outrigger block fastened to the exterior of the second frame;

(g) spacer means of predetermined thickness positioned against and retained by the at least first and second outrigger blocks between the first plane and the second plane removably connected to the first frame and the second frame thereby defining a uniform gap equal to the predetermined thickness of the spacer means; and (h) clamping means for pressing the frames together against the sealing means and the separator means so that the first frame is separated from the second frame by a distance that is no less than the uniform gap to form a substantially fluid-tight seal between the frames.

2. The apparatus according to claim 1 wherein the first sealing means and the second sealing means are gaskets.

3. The apparatus according to claim 2 wherein the separator means is hydraulically permeable.

4. The apparatus according to claim 2 wherein the separator means is a hydraulically impermeable permselective membrane.

5. The apparatus according to claims 3 or 4 wherein the spacer means further comprises substantially non-compressible insulating material.

6. The apparatus according to claim 5 wherein the spacer means is further made of micarta.

7. The apparatus according to claim 5 wherein the spacer means is made of wood.

8. The apparatus according to claim 2 wherein the outrigger blocks fixedly fastened to the exterior of the first and second frames each have at least one engaging surface adjacent the first and second planes against which the spacer means are positioned.

9. In an electrolytic cell having a plurality of adjacently positioned electrodes in which electrolyte fluid is contained, at least a first frame and an adjacent second frame, each frame having an exterior bounding opposing sides with an electrode face connected to each opposing side, at least one of the opposing sides of the first frame and the adjacent opposing side of the second frame defining at least a first plane and a generally parallel second plane, sealing means separating the first frame and the second frame, separator means positioned between the sealing means, and clamping means to press the frames together, the improvement comprising in combination; and (a) a plurality of outrigger blocks affixed to the exterior of the first frame and a corresponding plurality of outrigger blocks affixed to the exterior of the second frame opposite the outrigger blocks of the first frame;

(b) spacer means of predetermined thickness positioned between and retained by the oppositely positioned outrigger blocks between the first plane and the second plane removably connected to the frames to define and maintain a uniform gap between the planes when the frames are pressed together in fluid-tight fashion by the clamping means.

10. The apparatus according to claim 9 wherein the sealing means further comprises a first gasket and a second gasket, the first gasket contacting the first electrode frame member and the second gasket contacting the second electrode frame member.

11. The apparatus according to claim 10 wherein the separator means is hydraulically permeable.

12. The apparatus according to claim 10 wherein the separator means is hydraulically impermeable.

13. The apparatus according to claims 11 or 12 wherein the spacer means further comprises a substantially non-compressible insulating material.

14. The apparatus according to claim 13 wherein the spacer means further comprises the material micarta.

15. The apparatus according to claim 13 wherein the spacer means further comprises wood.

16. The apparatus according to claim 10 wherein the outrigger blocks fixedly fastened to the exterior of the first and second frames each have at least one engaging surface adjacent the first and second planes against which the spacer means are positioned.

17. In an electrolytic cell having a plurality of adjacently positioned electrodes in which electrolyte fluid is contained comprising at least:

(a) a first frame having a first generally planar side and an opposing second generally planar side to which are respectively connected a first generally planar electrode face and a second generally planar electrode face, at least the opposing second side defining a first plane;

(b) a second frame having a first generally planar side and an opposing second generally planar side to which are respectively connected a third generally planar electrode face and a fourth generally planar electrode face, at least the first side defining a second plane adjacent the first plane and being generally parallel thereto;

(c) separator means for separating the first frame from the second frame having a first surface adjacent the second electrode face and an opposing second surface adjacent the third electrode face;

(d) first sealing means contacting the second side of the first frame and the first surface of the separator means, the first sealing means having a contactable surface of a first predetermined surface area in contact with the separator means;

(e) second sealing means contacting the first side of the second frame and the second surface of the separator means having a first contactable surface with a first predetermined surface area adjacent the first side of the second frame and a second contactable surface with a second predetermined surface area contacting the separator means;

(f) spacer means of predetermined thickness positioned between the first plane and the second plane exterior of the first frame and the second frame and removably connected thereto, the spacer means having a first end and an opposing second end such that the first end is in coterminal but non-penetrating relationship with the first plane and the second end is in coterminal but non-penetrating relationship with the second plane, thereby defining a uniform gap equal to the predetermined thickness of the spacer means; and (g) clamping means for pressing the frames together against the sealing means and the separator means so that the first frame is separated from the second frame by a distance that is no less than the uniform gap to form a substantially fluid-tight seal between the frames.

18. The apparatus according to claim 17 wherein the first sealing means and the second sealing means are gaskets.

19. The apparatus according to claim 18 wherein the separator means is a hydraulically impermeable permselective membrane.

20. The apparatus according to claim 19 wherein the spacer means further comprises substantially non-compressible insulating material.

21. The apparatus according to claim 20 wherein the spacer means is further made of micarta.

22. The apparatus according to claim 17 wherein the spacer means are positioned between at least a first outrigger block fastened to the exterior of the first frame and at least a second outrigger block fastened to the exterior of the second frame.

* * * * *